Sept. 21, 1954  J. S. BALL ET AL  2,689,688
LOW-PRESSURE METHOD AND APPARATUS FOR PNEUMATIC ELEVATING
Filed Aug. 27, 1951  5 Sheets-Sheet 2

Sept. 21, 1954  J. S. BALL ET AL  2,689,688
LOW PRESSURE METHOD AND APPARATUS FOR PNEUMATIC ELEVATING
Filed Aug. 27, 1951  5 Sheets-Sheet 5

INVENTORS
J. S. Ball
J. F. Lockwood
BY G. Watts, Dec'd,
L. M. Watts, Ex'x,
Attorneys.

Patented Sept. 21, 1954

2,689,688

UNITED STATES PATENT OFFICE 2,689,688

LOW-PRESSURE METHOD AND APPARATUS FOR PNEUMATIC ELEVATING

John Stephen Ball and Joseph Flawith Lockwood, Stockport, England, and George Watts, deceased, late of Sale, near Manchester, England, by Lillian Maude Watts, executrix, Sale, near Manchester, England, assignors to Henry Simon (Holdings) Limited, Stockport, England, a British company Application Aug 27, 1951, Serial No. 243,902

Claims priority, application Great Britain November 4, 1949

25 Claims. (Cl. 241—12)

The present invention relates to pneumatic conveying of mill stocks. The latter term includes grain and the products resulting from the milling of grain.

More particularly, the invention relates to a novel low pressure method and apparatus of pneumatic conveying with the apparatus components in assembled and integrated relationship constituting the new low pressure system for conveying mill stocks.

The present invention is an improvement over and embodies features of co-pending application Serial No. 188,415 filed October 4, 1950, now abandoned, by John Stephen Ball, Joseph Flawith Lockwood, and George Watts, and entitled "Pneumatic Elevators for Flour Mill Stocks," Serial No. 188,416 filed October 4, 1950, by John Stephen Ball, Joseph Flawith Lockwood, and George Watts, and entitled "Pneumatic Elevators for Flour Mill Stocks." However, this application specifically continues application Serial No. 188,415.

The present invention, therefore, specifically relates to a method and apparatus for pneumatically elevating mill stocks from a grinding apparatus or mill, preferably of the roller type, located on one floor of a mill, to separating and purifying apparatus located on a mill floor above the first-mentioned floor, so that the system constitutes a low pressure pneumatic elevator embodying a substantially vertical lift and in which as one phase of the conveying, the air required for exhausting milling machines such as sieving machines, plan sifters and the mills per se is utilised for elevating the stock.

The invention specifically relates to a low pressure system of pneumatically conveying mill stocks from the milling apparatus such as roller mills to separation means of a particular type and in which the stock is diffused in the air current and conveyed substantially vertically.

The principle of conveying materials pneumatically has been known for many, many years and has been applied to various industries. The pneumatic conveying of mill stocks, however, has as a practical matter never been commercially applied until recently, except for individual purposes such as conveying bran, since the milling industry has considered that the power and consumption of the pneumatic system would be excessive. High negative pressures are necessary for handling very large quantities of material as, for example, in grain intake, and some form of exhauster is required. Recent developments in the industry have applied pneumatic conveying to mill stocks in which stock is conveyed through conduits by air pressure or an air exhaust or a negative pressure or suction in which conduits are disposed with portions either horizontal or with bends in the conduits. Such conduit bends even though being of the type which may be termed "gentle" bends, are nevertheless choke points which not only disrupt the operation of the system but further embody high power consumption which amounts to about 3.5 to 4.5 h. p. per 280 lb. sack of flour per hour, which is the equivalent of about 1 h. p. per ton of wheat ground every twenty-four hours. Such installations not only embody a high pressure fan which is connected to a separator to which the grain conduits extend but the discharge from this fan communicates with a dust collector which is exhausted by another fan discharging to atmosphere or back into the mill. In a known installation of this type the high pressure fan required fifty h. p. and the fan exhausting the dust collector six h. p.; the mill capacity, when working at a maximum, was 12 sacks of flour, of 280 lbs. each per hour, or 48 tons of wheat per 24 hours. It is therefore clear that the net increase in power consumption over that embodied in a bucket elevator mill of medium capacity, even after making allowances for elimination of the elevators and exhaust means on the mills and shifting machines, is about 2 to 3 h. p. per sack of flour (280 lbs.) per hour, or 0.5 to 0.75 h. p. per ton of wheat per day. It is therefore clear that a high pressure pneumatic system is very expensive, particularly where power costs are high. A high pressure system can be feasably operated if an ample margin of overload is provided which likewise increases the power consumption. However, if a choke occurs, such as in the bends or horizontal sections of the piping or conduits, the pipes must be dismantled and cleaned. In instances where a margin of 10% for overload has been provided and there is a sudden rush of accumulated stock as a result of clearing a choke at any portion of the conduit or piping, then any pipe is bound to choke where such a rush of stock exceeds 10% above the normal capacity of the pipe. In customary operations a mill having a high pressure conveying system of this type is run with the system empty every time the mill is closed down so that the feed hoppers of the mills per se do not have an accumulation of stock in them when the mill is started anew. This of course involves an additional expenditure of power. Therefore, and in explanation of power consumption in mills where horizontal piping is embodied and where the piping is carried around bends to change direction from a lower floor to a vertical lift or to change direction from the vertical lift into a separator, centrifugal action caused by these bends forces the stock to cling to the outer surface resulting in high pressure losses thereby necessitating initial high pressures to carry the stock around the bends. In order to avoid dust deposits in any vertical pipe sections between bends and in any pipe sections between bends and any separator which conventionally have horizontal inlets a high conveying speed is necessary. Since the power factor increases by the cube of the speed it is clear that double the air speed requires eight times the power and therefore one-half of the air speed would require only ⅛th of the power.

It is therefore a primary object of the present invention to provide a method and apparatus for conveying mill stock from the mills to separators on an upper floor of the mill building in which low pressures as compared with known systems are utilised and in which choking of stock in the conduits, either as a result of power failure or a sudden rush of stock, is eliminated.

It is an additional object to provide a method and apparatus for conveying mill stocks which in addition to requiring consumption of less power provides an efficient exhaust on the mills, cools the stock to within a few degrees of the temperature of the elevating air to bring it into better condition for sifting, avoids sweating on the interior of the conduits, eliminates to a substantial extent the insect infestation of the stock, and most importantly, removes the heat generated by the grinding mills.

It is a further object to provide a low pressure pneumatic conveying system for stocks which requires less space than elevator systems, thereby reducing the construction costs of a new mill or the revision costs of an old one, provides a system which embodies low maintenance costs, considerably reduces risk of fire, aerates the stock during handling, and greatly improves the general appearance of a mill, particularly since it requires a minimum of space.

It is a specific object to provide a method of conveying stock from a roller mill comprising feeding the stock by gravity into a substantially vertical air stream, diffusing the stock into the air stream, leading the stock and stream into a separating zone, imparting centrifugal force within the zone, suddenly expanding the stock and stream within the zone to lower the power factor applying the centrifugal force, and exhausting the stream following separation of the stock.

More specifically, the present invention has for an object to provide a method which comprises feeding stock by a gravity assisted air flow downwardly from beneath a mill, changing the direction of flow of the stream of air and stock to an upward vertical direction and at the same time feeding it, diffusing the stock into the stream simultaneously with the change in direction of the flow of the stream, leading the stream and diffused stock into a separating zone in a choke-free manner, while applying centrifugal force within the zone to exhaust the same and suddenly expanding the stock and stream as it enters the zone to lower the exhausting power required to exhaust the zone and separate the stock from the air therein.

An additional object is to provide such a method in which the air intake for the system is on the side of the mill opposite to the discharge thereof so that the exhausting of the separator establishes an air current through the mill to dissipate heat generated in grinding and to cool the stock during conveying and at the same time avoiding exhausting of air outside of the mill.

It is a further object to provide apparatus constituting a low pressure pneumatic conveying system including a downwardly extending discharge spout communicating with a mill and through which stock feeds by gravity, a diffusing chamber having an inlet communicating with the spout and a substantially vertically disposed outlet, a substantially vertically extending elevating pipe communicating with the outlet of the diffusing chamber, a cyclone separator having an expansion chamber therein including a steeply sloped bottom portion communicating with and substantially immediately adjacent the inlet of the cyclone, said elevating pipe communicating with the inlet of the cyclone and in choke-free manner, and air pressure inducing means communicating with the outlet of the cyclone.

It is a more specific object to further provide in the apparatus set forth in the preceding objects a tangential relationship of the inlet and outlet of the diffuser chamber and at least one release flap which in closed position constitutes a part of the wall of the diffuser chamber and which provides for automatic release of stock from the system upon power failure, or upon any unforeseen choking of the stock.

It is a further object to provide within the diffuser chamber beater means constituting a plurality of spirally arranged narrow blades mounted for rotation about a horizontal axis and which blades are operative to diffuse the stock into the air, assist the conveyance of stock through the diffuser chamber and through the abrupt change of direction leading to the tangential outlet of the diffuser chamber, and which blades are further effective to break up mill flakes formed during grinding operation; the size and the disposition of the blades is such that the passage of air through the diffuser is not restricted and thereby pressure losses are minimised to a negligible value.

It is a further object to provide a unique compound and highly efficient cyclone structure economical to produce and including a detachable outlet casing embodying a cylindrical portion and a tangential outlet with integrated attaching means embodied with the top and bottom of this casing providing for attachment of the outlet casing to either right or left hand cyclones, respectively, on either the right or left hand side of the longitudinal axis of the mill floor.

Additional and more specific objects and advantages will be apparent from the accompanying drawings, in which:

Figure 4 is a side view partly in section of a diffuser chamber of a modified form;

Figure 5 is an end view partly in section looking from right to left of Figure 4;

Figures 1, 2:
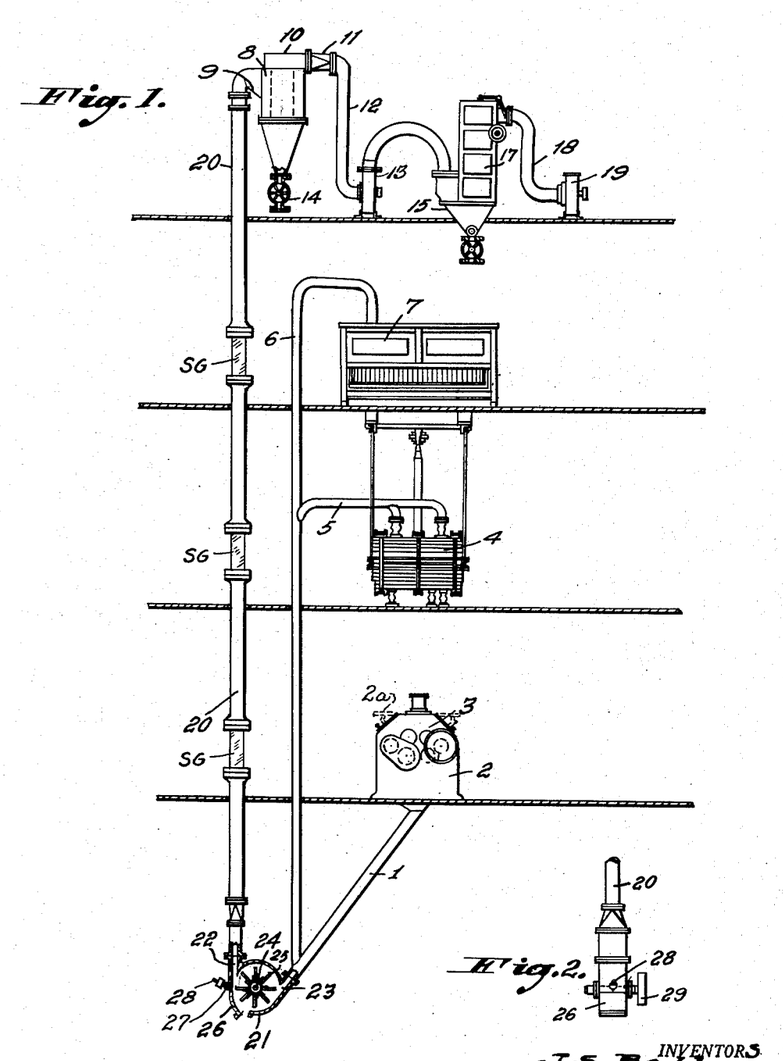
Figure 1 illustrates diagrammatically a pneumatic system for the low pressure conveying of mill stock where mill stock and exhaust air are obtained from one machine, that is, the mill, and exhaust air from other mill components is mixed therewith to assist in elevating the stock and incorporating in section one form of diffuser chamber.
Figure 2 is an end view of the lower part of Figure 1 looking from left to right of that figure.

In connection with the consideration of this invention it must be borne in mind that the handling of mill stocks in a mill embodies a number of different machines, such as mills, purifiers, plan sifters, and the like. Normally a mill will embody a plurality of these machines on each floor and the different type machines all occupying a different floor. Additionally, it is conventional to have in a mill plural sets of machines on opposite sides of the longitudinal axis running the length of the various mill floors. Therefore, as indicated in Figure 1 in an embodiment of this invention, five floors are occupied by component parts of the mill. Beneath the ceiling of the first floor depends the downwardly extending and, as illustrated, inclined discharge spout 1 that communicates with the hopper of a roller mill 2 supported on the second floor. The rolls are indicated at 3 and adjustable doors 2a are provided along the opposite inclined upper sides of the mill to control the intake of air into the mill. On the floor above the mill is illustrated a plan sifter 4, the exhaust of which is conveyed through a pipe 5 communicating with a down pipe 6 which extends to and communicates with pipe 1 on the bottom floor. Above the plan sifter is a purifier 7, the exhaust of which flows through the pipe 6. On the top floor there is located a cyclone separator of the improved type noted at 8 having an expansion chamber at the inlet thereof including an inlet with a steeply sloped bottom 9 and an outlet casing 10 providing a tangential outlet through the duct 11 which communicates through a conduit 12 with a suction fan 13. The discharge of stock from the hopper of the cyclone separator is controlled by a rotary air seal 14 and the fan discharge is communicated to an additional separator or dust collector 15 which may be provided with textile filters in a vertically extending section denoted at 17. The exhaust from the dust collector 15 is directed through a conduit 18 to an exhaust fan 19 which exhausts either into a conduit, not shown, to atmosphere or preferably and advantageously into the mill.

Communicating with the inlet of the cyclone is a vertical pipe constituting an elevating conduit 20. In Figure 1 this pipe is completely vertical and at its lower end is coupled to means defining a diffuser chamber 21. This diffuser chamber is cylindrical in section and disposed on a horizontal axis and the outlet therefrom into the pipe 20 includes the tangentially disposed duct portion 22. A tangentially disposed inlet duct portion 23 likewise communicates with the diffuser chamber and is connected to the discharge pipe 1 feeding stock from the mill 2. Within the diffuser chamber and rotatably mounted on a horizontal axis 24 is a beater wheel 25 embodying a plurality of thin blades spirally arranged on the shaft constituting the axis 24 and operable to diffuse and deflake the stock into the air stream flowing upwardly through pipe 20. A portion 26 of the diffuser casing 21 is hinged at 27 and is counterbalanced by a weight 28 so that this portion constitutes a flap which is normally opened when there is no suction applied through pipe 20 but which flap closes upon the application of suction created by the fans 13 and 19. If the fan suction should fail the flap 26 will open and allow stock which may descend by gravity down the pipes 1 and 20 to pass out of the system on to the lowermost floor of the mill; thus when air flow through the system is restored there will be no chokes or blocks caused by the accumulation of stock. As indicated in Figure 2, a pulley 29 is connected to the shaft constituting the axis 24 for driving the beaters. Therefore, Figures 1 and 2 illustrate the complete layout of one type of grouping of machines in a mill. It will be appreciated that where a plurality of machines are mounted on each floor a single through shaft can constitute the horizontal axis 24 and all of the beaters can be driven by a single power source, not shown. It is likewise clear that where a reverse arrangement as compared with Figure 1 is mounted on the right hand side of the longitudinal axis of a mill the outlets from the cyclones can communicate with a single exhaust fan, the outlet of which will be in communication with a dust collector.

Therefore, in carrying out the method of low pressure conveying of mill stocks it is clear that stock after passing through the rolls in the mill 2 is discharged by gravity through the spout 1 and enters the diffuser chamber 21 through the tangential inlet 23. Suction being applied by the fans 13 and 19 a current will be induced through the vertical elevator conduit or pipe 20 so that the flap 26 is closed and rotation of the beater wheel 25 will diffuse the stock into the air stream. As will be explained more in detail hereinafter, the peripheral speed of this beater wheel may be less than the speed of the conveying air but the speed thereof can be varied within wide ranges and due to the size and relationship of the blades constituting the beater wheel the stock is thoroughly diffused into the air stream and any flakes that are embodied in the stock coming into mill through pipe 1 will be broken up. The diffuser chamber, therefore, assists the stock in its abrupt change of path around the base of the substantial V comprised between the axes of the pipes 1 and 20 and the stock is conveyed vertically upwardly through the pipe 20 and enters the cyclone 8 through the expansion chamber having the steeply sloped bottom 9. Since there is no horizontal portion in the conveying path from the mill to the cyclone and since the beater wheel and the diffuser chamber assist the movement of the stock through the chamber and into the pipe 20 there are no areas constituting choke points in the conveying path and the efficiency and separating effect of the cyclone 8 is enhanced by the abrupt expansion of the stock and air as it enters the cyclone, the bulk of the stock falling down the steeply sloped bottom 9 into the hopper portion of the cyclone. Thus the centrifugal path of the stock and air through the cyclone is accompanied by less than the major quantity of the stock. In other words, on entry of the stream of stock and air into the expansion chamber which communicates with the outer vortex chamber of the cyclone the bulk of the stock immediately falls to the hopper so that the stream flowing around the outer vortex is largely air and dust and less power to drive the fan 13 is required than in conventional high pressure systems. Additionally, the dust and air passes up the vertically disposed outlet into the outlet whirl chamber 10, thence into the fan, the structure and disposition of the outlet chamber and the expansion chamber in the cyclone combining to lessen the power requirements of the fan 13 in conveying the stock to the system in view of the fact that potential choke points in the conveying path are eliminated. From the fan 13 the dust and any small quantities of stock of very light weight are conveyed to the dust collector 15. The exhausts from the purifier and plan sifter are discharged through pipes 5 and 6 into the pipe 1. The air exhausted from the purifier and plan sifter does not contain the stock dealt with by those machines but is utilised to assist in the elevation of the stock. In this connection it is to be noted that the elevation of the stock from the mill can be accomplished by the exhaust air from the purifier 7 and the plan sifter 4 without the assistance of air from other machines. It is thus clear that the present method involves not only the gravity feed of stock into a tangential inlet to a diffuser chamber and an abrupt change of path from a downwardly inclined path to an upward vertical path by a diffusion of the stock into the air stream at the change of direction, since the shaft constituting the axis 24 is between the V comprised by the axis of the pipes 1 and 20, but also the exhaust air from the purifier and plan sifter is entrained into the system to lift the stock. While the drawings disclose a particular inclined pipe 1 it is obvious that certain mills may require a different physical layout of pipes from the mill to the diffuser chamber.

From a broad concept, therefore, the method applicable to a diffuser chamber embodies feeding stock in a path the angle of which is greater than the natural angle of repose of the stock into a diffuser chamber, diffusing the stock within the stream in the chamber while changing the path of flow to a vertical upward path.

Preferably, however, the diffuser chamber is of the type embodied in Figures 1, 3, 4 and 5 referred to hereinafter, since the power factors will be somewhat increased when supplementary air is utilised as the diffusing means. However, even with the use of such supplementary air the power consumption will still be materially less than that effected in conventional high pressure conveying systems.

With respect to Figure 3 there is illustrated diagrammatically a somewhat different layout in which a plurality of mills 30 are arranged in pairs on opposite sides of the longitudinal axis of the mill. All of the mill floors have not been shown and the drawing has been broken away. The drawing indicates on a superjacent floor a left and right hand bank of plan sifters 31 and on the top floor a left and right hand bank of cyclones 32 of the type embodied in detail in Figures 8 and 12. As shown in the drawing, the mills 30 each have the conventional rolls 33 therein and adjustable air intake doors or flaps 34, the dotted lines indicating the doors opened. Beneath the rolls, hoppers 35 are provided discharging into branched discharge pipes 36 and 37 for each pair of mills respectively communicating with the inclined feed spout or pipe 38 which via a tangential inlet enters a diffuser chamber 39, the outlet of which extends tangentially to the axis thereof and communicates with a vertical lift pipe 40. It must be borne in mind that the height of the mill building is substantial and the extent of this pipe 40 may run as high as 100 feet. The upper end of the pipe communicates with the cyclone 32. The inlet of the cyclone embodies an expansion chamber with the steeply sloped bottom 41, as will be described in detail hereinafter. The outlet casing 42 of the cyclone communicates via a duct 43 with the suction fans 44. As shown, the right and left hand banks of the cyclone both exhaust into the fan 44, the outlet of which is connected to a dust collector and filter 45. A suitable low pressure fan 44′ is connected to the outlet of the filter chamber and preferably exhausts into the mill. As indicated in dotted lines, if desirable the exhaust from the machines 31 can be conducted into the feed spout 38 in a manner similar to that referred to in Figure 1. The system is such that with the fan 44 exhausting through cyclone and through pipe 40 and the doors 34 opened the air intake into the mill cools the rolls and dissipates the heat of grinding and thereby the stock products are cooled so that further sifting efficiency is enhanced, the sweating of the conduits is avoided and insect infestation is reduced. The diffuser chamber 39 is provided with flaps, as will be described in detail hereinafter, with reference to Figures 4 and 5, so that should the power or air fail or a sudden rush of stock occur the stock in excess of that which the air can carry is deposited on the floor of the mill instead of choking. The quantity of stock up to that of the capacity of the pipe continues to be conveyed by the air.

It should at this point be indicated that the stock is spouted through pipes 38 in Figure 3 and 1 in Figure 1 and will fall by gravity into a vertical air stream. The arrangement may further comprise a gravity assisted air spout 37 conveying the stock from the centre or outer line of roller mills to the elevating pipe. The spout 37 is an inclined metal pipe in which the drag exerted by the air or the stock is sufficient to overcome frictional resistance between the stock and the spout thus rendering it fluid. The air naturally travels with the material and not against the force of gravity. Therefore, very little power is required to move the material.

In connection with this system it is noted that there are absolutely no horizontal sections and there are no bends which could cause pressure losses. In a horizontal pipe as conventionally used whether it be in the area between the under surfaces of the mill to the vertical pipe or between the vertical pipe and the cyclone the air velocity has to be high enough to prevent any deposit of particles caused by gravity. In a vertical pipe there is no place for particles to lodge and even if some do momentarily lodge and then tend to fall by gravity they would be picked up in the ascending air current. With this arrangement the most suitable air velocity is twice the terminal velocity of the material, the terminal velocity being the velocity of the air at which a particle will remain suspended stationary in the air. This velocity will differ considerably for different materials according to the shape and specific gravity thereof. For example, wheat has a terminal velocity of about 1500 feet per minute according to the type of wheat, while some flour mill stocks have a terminal velocity of only 300 feet per minute. Therefore, the present system is such that air speed never has to exceed more than twice the terminal velocity. With conventional high pressure systems a speed much more than twice the terminal velocity is necessary to overcome the force of gravity in any horizontal pipe section or places where material can lodge or build up and thereby cause pressure losses. The building up of particles will cause chokes in the pipe, particularly at bends where centrifugal action causes stock to cling to the outer surface thus causing high pressure losses. As has previously been pointed out, as the air speed in the pipe is increased so is the power and in a given pipe size twice the air speed requires eight times the power.

Figure 3:
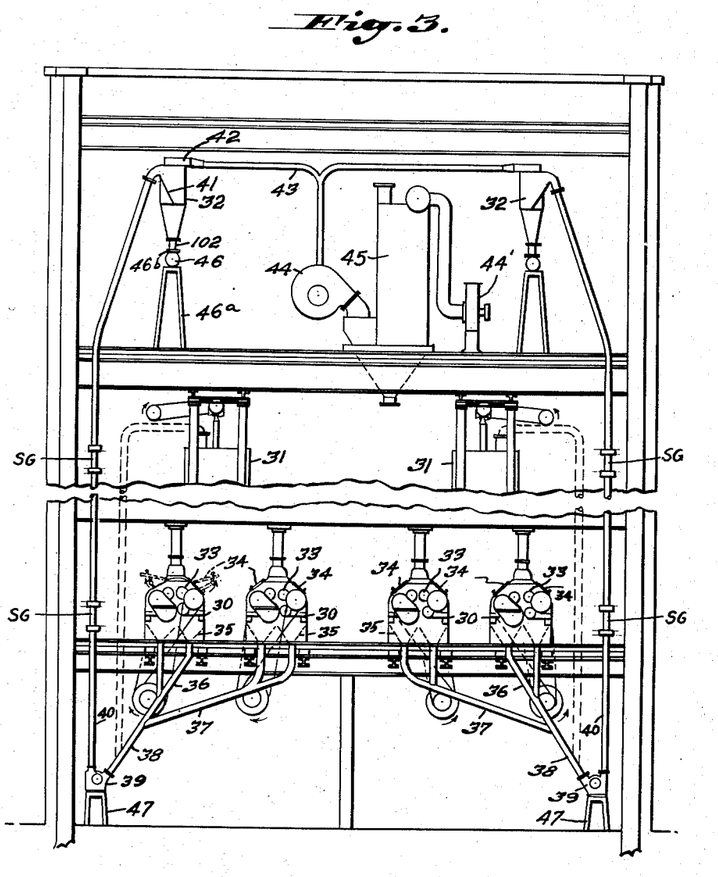
Figure 3 is a diagrammatic view of an installation in a mill embodying plural roller mills, substantially vertically extending lift pipes and novel cyclone separators connected therewith in a choke-free manner.
Figure 6:
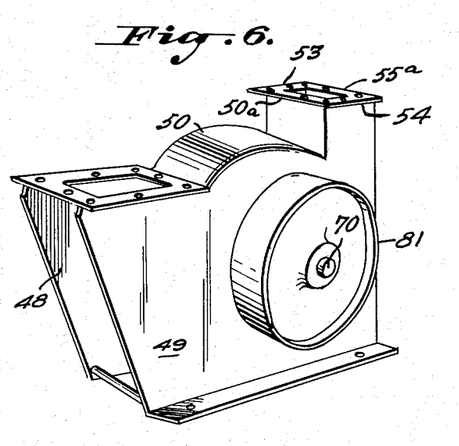
Figure 6 is a perspective view of the diffuser chamber.

In connection with this system the elevating pipes 1 or 40, Figures 1 and 3, are preferably of drawn light alloy tubing with a very smooth internal surface. Since the overall mill height may vary from mill to mill these pipes are supplied in various lengths to suit a particular mill and coupled together with rubber couplings or clips. Sight glasses SG are fitted for visual inspection in the pipes on the roll and plan sifter floors. The material used for the tubing or pipe is preferably non-corrosive.

The rotary seals indicated at 46 in Figure 3 are of cast iron and the rotor and casing are machined to very fine limits to prevent any air leaks through the seal which would impair the efficiency of the cyclone. The rotor is mounted on ball bearings to reduce the power required to a minimum.

In connection with the diffuser casings 39 in Figure 3, the same are preferably mounted on a frame work or table support 47 and in instances where the angle of inclination of the pipe 38 leading to the tangential inlet into the diffusing chamber 39 is slightly different, the inlet to the chamber is rearranged correspondingly.

The specific form of diffuser chamber and beater, therefore, is preferably of the structure indicated in Figures 4 through 7. In these figures the diffuser chamber includes opposite side walls 48 and 49, a top wall 50 and a bottom wall 51. The side walls are spaced by suitable distance tubes 52 and provided with flanges 53 and 54, Figure 5, receiving a flange on the vertical lift pipe section 40a shown in the right of Figure 4. The top wall 50 is provided with a flange 50a similar to flanges 53 and 54 but extending transversely with respect thereto. A cross piece 55 extends across the outlet side immediately subjacent the connection to the vertical lift pipe and includes a flange portion 55a, and a flap or release plate 56 is hinged adjacent the cross piece on a hinge pin 57. This flap includes a plate member 56a and a longitudinally extending flanged reinforcing rib 56b. On the lower end of the plate is provided a sealing strip 56c and the pintle encompassing portion includes a sleeve member that is bolted to the plate at 56d and a cotter pin passes through aligned apertures in this sleeve member and an aligned transverse bore in the hinge pin or pintle 57. Therefore, as shown, the structure provides a tangential outlet with a release plate or flap which in closed position constitutes a portion of the wall of the diffuser chamber.

At the inlet side of the diffuser, that is, to the left in Figure 4, another transversely extending cross piece 58 including a flange constituting portion 58a is secured between the side plates. The top plate 50 includes a flange constituting portion and additional flanges 53a and 53b are provided on the respective side plates so that the inner periphery of the flanges constitute an inlet opening. Another release plate or flap 61 is mounted on a pintle 62 for pivoting movement and this plate or flap is similar to the plate 56 and includes the plate portions 61a and the longitudinally extending flanged external rib portion 61b. This release plate 61 thus in closed position constitutes a portion of the wall on the inlet side of the diffuser chamber. Rods 63 and 64 are respectively tack welded to the release plates or flaps 56 and 61 and are threaded on their outer portions so as to adjustably receive weight members having internally threaded apertures therein, not shown, for counterbalancing the flaps or plates for the purpose as hereinafter set forth.

In order to provide for adjustability of the size of the opening controlled by flap 56 an eccentric 63a is mounted on an eccentric stud 63b which is provided with a slot on the head thereof adapted to cooperate with a screw driver or similar tool permitting turning of the eccentric. A double coil spring washer 63c bears between the side plate 49 and the under surface of the head 63b. As shown in Figure 4, the eccentric is in such position that the flap 56 can swing through such an arc as to provide a fairly large discharge conduit in substantial vertical alignment with the tangential outlet. The eccentric can be so positioned that the flap 56 can be maintained substantially closed by rotating the stud. Thus, the adjustability of the opening is determined by the arc through which the release flap can swing before it abuts the eccentric which, as indicated in Fig. 5, is in the path of movement of the face of the flap near the edge thereof. The opposite flap is limited in its outward movement by a stop bar noted at 64a which extends between the side plates. Thus, the flap 61 can open through a substantial arc to provide a discharge from the diffuser chamber subjacent the inlet thereinto.

The beater structure including a unique mounting arrangement therefor is comprised by housing supporting rings 65 and 66 welded to the respective side plates which are provided with transversely aligned openings. Similar bearing housings 67 and 68 are secured to the respective rings by bolts or cap screws 69 which pass through aligned apertures in external flanges on the housings and in the rings. The side walls of the respective housings are grooved so as to accommodate the heads of the cap screws in assembling the structure. A transversely extending shaft 70 is supported by spaced ball bearing assemblies 71 and 72. As shown in the drawings, the shaft includes an enlarged central portion which in practice may have a diameter of 40 mms. and reduced portions of 30 mm. diameter extending outwardly therefrom. Sets of felt packing washers 73 and 74 are disposed between internal end flanges on the respective housings and lock rings 75 and 76 which maintain the washers in position. The bearing assemblies are mounted on the outer reduced portions of the shaft and circular end clips 77 and 78 hold the same in position.

Figure 7:
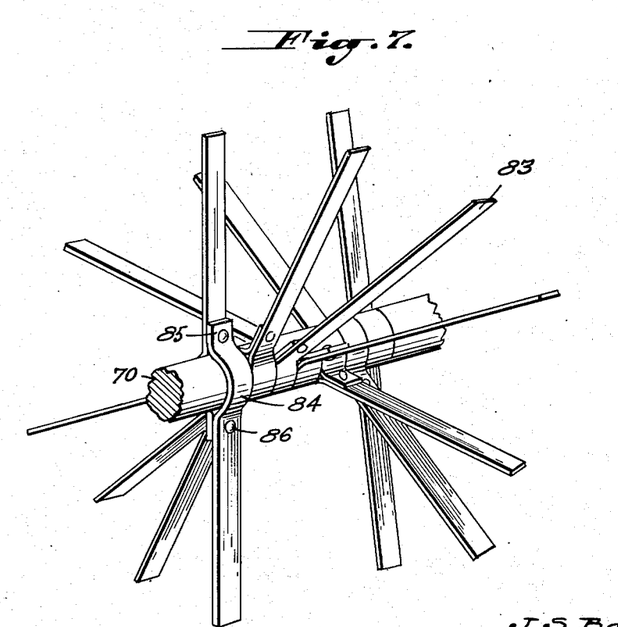
Figure 7 is an enlarged partial perspective view of the beater means embodied within the diffuser chamber.

As viewed in the drawing, the right hand bearing housing is closed by a floating bearing cap 79 and the opposite housing is closed by an apertured locating bearing cap 80 which is provided with a felt washer mounted in a groove in the wall portion defining the aperture. The adjacent shaft portion projects outwardly of this cap 80 and a pulley 81 is secured thereto by a set screw 82. Any other type of conventional spline or key joint can be utilised to secure the pulley to the shaft. The shaft 70 constitutes the beater shaft and beater fingers 83 are mounted thereon. As shown in Figure 7, these fingers are arranged in pairs with the fingers of each pair being secured together. The fingers are set to form a spiral and are long and narrow so that their size, shape and disposition offers minimum resistance to air flow through the diffuser chamber. Each finger is provided with an arcuate offset portion 84 and an inner terminal end portion 85 which is in the same plane as the major outwardly extending portion of the finger. Thus two fingers secured together by bolts 86 provide an arcuate hub or shaft engaging collar therebetween. In the arrangement illustrated, there are 14 fingers connected to constitute 7 pairs of fingers and, as shown in Figure 5, in bolting the fingers of each pair together and in mounting them on the shaft space is left between the respective end fingers and the adjacent side plates. Flanged foot members 87 are bolted to the lower ends of the side plates so that the diffuser chamber can be supported on a table or frame as shown at 47 in Figure 3.

The inlet to the diffuser is completed by a collar member 88 provided with a lower flange which is secured by bolts to the adjacent flanges on the diffuser chamber after interposing a gasket therebetween. The upper portion of the collar member is additionally flanged and the flanged lower end of a tubular feed spout connecting section 89 is secured thereto by a clamping ring 90 after a suitable gasket or washer has been interposed between the flanges. The collar member provides a transition from the round opening to the square inlet opening to the diffuser chamber. In the assembly shown, the axis of the duct or pipe section 89 is at a 50° angle to the horizontal and its longitudinal centre line is parallel with the plane of the flap or plate 61 when the latter is closed. It is therefore clear that a tangential inlet is provided into the diffuser chamber. As illustrated, the arrangement is intended for use in a mill where the feed spout from the mill is at a 50° angle to the horizontal. Obviously the angularity of the duct section 89 can be varied to accommodate different tubing arrangements in mills when space factors and the particular physical location of the different mills are taken into consideration.

In connection with the diffuser it should be pointed out that in conventional mill layouts it is necessary to provide detachers to break up flakes coming from the mill. With the present invention such additional apparatus is no longer necessary.

The diffuser feeds the stock into the vertical air stream into the conduit 40 with a minimum of pressure loss since the size, shape and disposition of the fingers 83 on the shaft offer minimum resistance to air flow. The diffuser constitutes, therefore, an enclosed cylinder on a horizontal axis and the vertical elevating pipe and the inlet feed spout are attached thereto tangentially. As is clear from the drawings, the diffuser chamber has a substantially greater cross sectional area than the cross sectional area of the feed spout. The thin fingers 83 diffuse the stock through the air stream. At this point it is well to note that the peripheral speed of the fingers is considerably less than the speed of the conveying air. The air necessary to elevate the stock is drawn from the roller mills 30 at low speed down the gravity or gravity assisted air spout thus effecting an efficient exhaust.

The diffusers are each fitted with release flaps or plates which are held in closed position by the suction of the air and are so counterbalanced by the weights, not shown, that a falling off in the supply of air or an excess of stock will cause them to open and discharge the excess stock on the floor. If the power fails or there is a sudden rush of stock the stock in excess of that which the air can lift is deposited on the floor instead of choking the pipe while the remainder of the stock continues to be lifted. In the event the power to the diffuser fails excess stock will fall through the flap plate 61. The detachers are unnecessary because the action of the diffusers and the impact from the air caused by the speed at which the stock travels have a similar effect as a centrifugal in breaking up the flakes.

As previously indicated in mill layouts where a plurality of diffusers are mounted on a frame of the type indicated at 49 in order to reduce power required to a minimum the diffuser for the full length of the mill may be mounted on one through shaft supported by the normal shaft bearings. Where it is necessary to drive each diffuser independently ball bearing assemblies illustrated in the bearing housings of Figure 5 are of ample proportions. The power required to drive a single diffuser is 1/30th of a h. p., that is, 0.03 h. p. Thus, briefly, the diffuser does three things:

(a) It enables the stock to be taken through the abrupt change in direction from the downwardly inclined feed spout to the vertically extending lift pipe at a low air speed without the risk of stock lodging in the chamber and it feeds the stock into the vertical pipe with a minimum of pressure loss;

(b) The diffuser functions as an automatic ejector for the stock in excess of that which the pipe can carry; and (c) The diffuser contributes to the breaking up of flakes and thus makes detachers unnecessary.

The diffuser will operate efficiently at any speed from 200 revolutions up to about 5000. There is thus a very wide range of speeds at which it can be operated to provide the breaking up action on flakes made by the roller mills. Thus at a speed of 200 revolutions the diffusing action and movemnt of the stock through the diffuser chamber is efficient and there is very little breaking of the flakes, while at a speed of 800 revolutions we obtain an almost perfect breaking up of flakes.

In further connection with this diffuser and in conjunction with the choke-free advantages of the present invention, the diffuser structure including the flaps or plates ensures that the system will not choke even in the event of careless operation of the plant or power failure since, as described, where either of these contingencies exists and the conveying pipes are not capable of conveying the material the pipes will not be choked but the diffuser will release the excess material outside the system.

The release plates in contradistinction to any known flaps or gates on elevator boots are operative in our low pressure system. The known elevator boot gates while operative on material such as wheat, which is free flowing, will not operate efficiently with light weight materials such as flour or mill stocks which are not only of a very light weight per cubic foot but are also sticky and thus the material will bridge over an opening of several inches without flowing out. Due to the particular arrangement of our flaps or plates and the cooperation therewith of the beater fingers the beaters will force material out through the opening if the suction diminishes even though light weight and stick materials are involved. While it has been indicated that the peripheral speed of the beaters may be less than the speed of the conveying air this is not intended to be a limitation on the operation of the system, since the peripheral speed may, when occasion requires, be higher than the speed of the conveying air.

Another factor to be considered with respect to the diffuser is that the inlet spout is not limited as to area with the exception as to space requirements. This spout must be large enough to provide a low air speed down the spout from the mill machine which is being exhausted. In general the larger the area and the lower the speed the better. In connection with the tangential outlet from the chamber, however, it is desirable to increase the speed of the air at the point at which the diffuser joins the vertical pipe. This enables the stock to be picked up with more more rapidity in a high velocity air current.

It is therefore clear that the diffuser embodying the tangential inlets and outlets and the beater fingers rotating in a horizontally disposed drum or chamber and including release plates or flaps provides an important technological advance in the art.

To the present we have discussed the system in general and the diffuser component in detail. With respect to the cyclone illustrated in Figures 8 through 12 and which as illustrated in Figures 1 to 3 has its outlet connected to a suction fan, it must be borne in mind that cyclone separators per se are very, very old in many arts. However, the disclosed cyclone structure is distinctly different in that it provides a vertical or a substantially vertical tangential inlet. As illustrated in Figure 1, the cyclone includes the combination of inner and outer walls which define an outer vortex chamber therebetween and a conical hopper extending beneath the same which constitutes the bottom of the cyclone. A vertically disposed elevating pipe is comprised by the pipe 20 and an expansion chamber is incorporated with the cyclone, including a steeply sloped bottom wall 9 which communicates with the vertical elevating pipe at a steep angle downwardly and which bottom extends to and terminates immediately adjacent the upper end of the conical hopper and in this connection the vertical outlet from the cyclone extends down into the hopper a distance beneath the lower terminal end of the bottom of the expansion chamber. The expansion chamber, therefore, is disposed tangentially with respect to the outer vortex chamber and provides direct communication between this chamber and the vertical pipe 20. As indicated in the drawings, the upper end of the steeply sloped bottom 9 is abruptly curved to lie in communication with the vertical pipe 20 so that in the event of suction failure stock will fall either back down the pipe 20 or down the bottom 9. An important point embodied in this arrangement is that in event of power failure any stock in the pipe 20 will fall back down the same and out the release gate 26 or 56. The inlet from the vertical pipe to the expansion chamber being curved enables air to go around the bend with as little eddying as possible. Since the cyclone must collect huge concentrations of material amounting to as much as several tons per hour it will be seen that this is an important factor. The steeply sloped bottom is such that as soon as the stock and air stream enter the expansion chamber a large amount of material is dropped from the air leaving a lower concentration of material to be separated by cyclone action thereby requiring less power on the exhaust fan. This steeply sloped bottom, therefore, must be steep enough to allow material to flow by gravity and not remain lodged thereon which would cause a build up of stock and thereby pressure losses and possibly choking of the cyclone when operating on low pressure. In this connection this slope should not be less than 60° to the horizontal.

Figures 8, 9, 10, 11, 12:
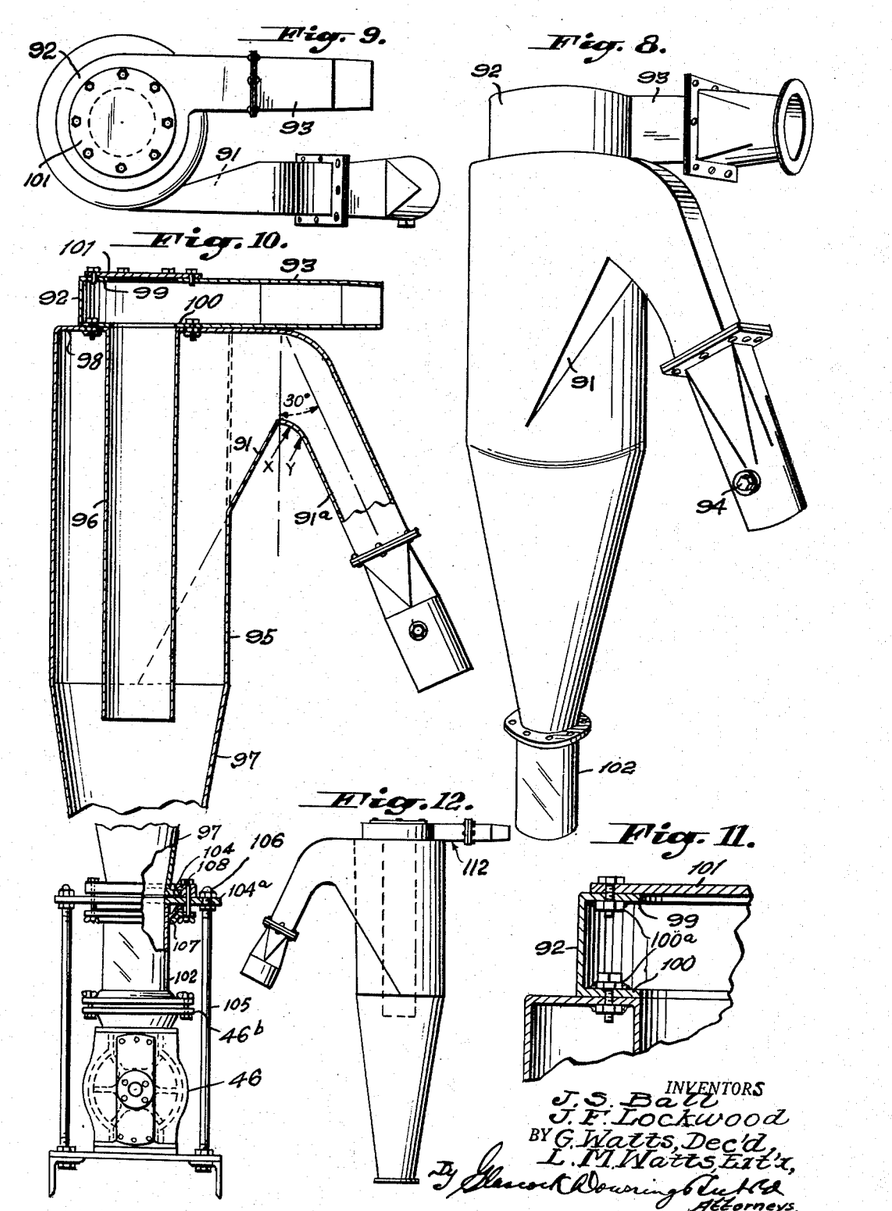
Figure 8 is a perspective view of the improved cyclone separator as embodied in the system of Figure 3.
Figure 9 is a reduced plan view of the cyclone separator shown in Figure 8.
Figure 10 is an enlarged view partly in section of the cyclone separator of Figure 8.
Figure 11 is an enlarged sectional detail view illustrating the connection of the outlet casing of the cyclone to the body of the same.
Figure 12 is a diagrammatic view illustrating a right hand cyclone on a reduced scale.

In connection with the arrangement of Figures 8 to 12 it is found that the lift pipe as shown in Figure 3 does not in all instances have to be completely vertical as shown in Figure 1. It must be substantially vertical throughout most of its length but in the portion immediately preceding the cyclone it must be at an angle of not less than 60° to the horizontal. A completely vertical pipe is preferable but owing to space limitations it is not always practicable, and an excellent arrangement is found to consist in a system in which the inlet to the expansion chamber is at a 30° angle to the vertical, as illustrated in Figure 10.

In Figure 8 the cyclone is illustrated in perspective and includes the body and conical hopper portion and the expansion chamber having the steeply sloped bottom 91. The inlet as shown is in angular section and includes connecting portions providing a transition to the tubular lift pipe. An outlet chamber 92 is secured to the top of the cyclone and includes a tangentially arranged outlet duct portion 93. The inlet portion is provided with a plug 94. In connection with the outlet casing 92 as shown in Figure 9 the same is illustrated as having its tangential outlet extending in parallel with the expansion chamber from the inlet to the outer vortex chamber of the cyclone. An important feature of this invention is the adjustability of this outlet casing with respect to the cyclone body and the fact that this outlet casing structure can be embodied with both right and left hand cyclones and have its outlet extend either from the same side of the cyclone body as does the inlet or extend from the opposite side as shown at 112 in connection with Figures 3 and 12.

The cyclone is further illustrated in section in Figure 10 and as shown includes outer walls 95 and an inner tubular portion 96 spaced therefrom so that the area between the walls and the tubular portion constitutes an outer vortex chamber. The tubular portion 96 extends below the juncture of the outer walls with the conical hopper 97 and the steeply sloped bottom 91 of the expansion chamber extends downwardly and terminates on the horizontal plane defining the juncture between walls 95 of the upper end of the hopper 97.

An operative embodiment of the cyclone includes an inner tubular portion or outlet duct having 140 mm. internal diameter and the internal diameter of the body portion being 350 mms. The body portion is 640 mms. in axial extent and the tubular portion 96 is 716 mms., so so that its lower end projects quite a distance below the bottom terminus of the body portion. The overall height of the cyclone from the top thereof to the bottom of the conical hopper is 1411.5 mms. or approximately 55.57 inches.

As previously indicated and as shown on the drawings, the inlet into the expansion chamber has its axis at 30° to the vertical line passing through the top planar portion of the steeply sloped bottom 91. The curve of the bottom surface of this inlet 91a has a first portion x extending over a curve of 65° radius and a second portion y merges into the straight duct section 91a over 190° radius. The curve of the top portion of the duct 91a merging with the top wall of the expansion chamber is on a 135° inside radius. The vertical distance between the upper terminal end of the planar portion of the sloped bottom 91 to the under surface of the top of the cyclone and the terminal end of the 135° radius curve is 178 mms. This precise structural arrangement is highly efficient in permitting stock and air to flow from the vertical duct 40 into the cyclone in a choke-free manner. It is clear that there are no bends where stock could accumulate and should the pressure fall the stock will not lodge but fall down either the steeply sloped bottom or the inlet duct portion 91a and thence down the lift pipe 40.

The cyclone includes a top plate 98 which is provided with a central aperture and the tubular portion 96 is welded thereto adjacent the aperture. The outlet casing is of unique structure and includes top and bottom walls 99 and 100 each provided with a central aperture therein. A circular series of nuts 100a is welded to the under surface of the top wall 99 and also to the upper or facing surface of the bottom wall 100. A series of nuts is likewise welded to the under surface of the top plate 98 of the cyclone thereby providing a detachable and adjustable arrangement of the mounting between the outlet casing 92 and the cyclone. It is believed clear, as shown in Figure 11, that the outlet casing can be first bolted to the top plate 98 of the cyclone and then a cover plate 101 bolted to the top plate 99 of the outlet casing to cover the aperture therein. In the arrangement illustrated in Figure 10 if it is desirous for special reasons or other considerations that the outlet duct 93 of the outlet chamber be directed away from the inlet or, in other words, be transposed so as to project from the left of Figure 10, the top cover plate may be removed, the bolts coupling the bottom plate of the outlet chamber to the cyclone removed, and the outlet casing inverted or, in other words, swung from right to left so that the top plate 99 as shown in Figure 10 then becomes the bottom plate and the outlet casing secured to the cyclone in an inverted position with the outlet duct thereof projecting from what would then be the left in Figure 10. This is an important technical advantage insofar as space factors are concerned in that with the adjustability of mounting the outlet casing to the top of the cyclone the outlet casing structure can be standardized and mounted on either right or left hand cyclones as shown respectively in Figures 10 and 11 and as indicated in Figure 3, and extend from either the right or the left hand side, the longitudinal axis thereof depending on the piping arrangement in the mill.

In connection with the cyclone a sight glass 102 is detachably secured to the bottom of the conical hopper. To provide for this mounting a clamp ring 103 is slipped over the lower end of the bottom of the hopper 97 before an end flange 104 is welded thereto. As indicated in Figure 3, a rotary seal 46 is supported on a frame or table 46a. Supported above the rotary seal is a plate indicated at 104a provided with a central aperture therein. This plate is mounted on stud bolts 105 and can be elevated with respect thereto by taking off the nuts 106. The plate has a central aperture within which extends the sight glass or tube 102 and the bottom end of the sight tube is removably clamped to the upper end of the rotary seal as at 46b in Figure 3. The top of the sight tube is clamped between the flange 104 and a ring flange clamping member 107 by the clamp ring 103 which has an internal diameter greater than the lowermost portion of the cyclone so that it can be raised or lowered thereon and has a flange 108 which fits down on top of the flange 104 so that with the unit assembled in order to remove and replace the sight tube it is possible to remove the bolts holding the clamp ring 103 in place, remove the ring 107, remove the bolts 106, then elevate the apertured plate 104a and clamp ring and thus remove the sight tube.

It is thereby clear that the present invention provides a low pressure pneumatic system in which the combination of the gravity feed, vertical lift, particular cyclone structure, and the diffuser all co-operate to reduce the power factors required, the diffuser preventing choking and loss of pressure and diffusing the stock into the air stream so that it can pass through the diffuser in the abrupt change of travel from the downwardly inclined path from the mill to the vertical lift pipe having the vertically flowing air stream therein, and the cyclone provided with the expansion chamber having the steeply sloped bottom permitting rapid expansion of air and stock as it enters the cyclone with the immediate deposit of the bulk of the material in the air on the bottom for gravity descent into the hopper thereby reducing the amount of stock subjected to the centrifugal vortex action in the cyclone and consequently reducing the pressure required in exhausting the cyclone. In addition, the system provides a very efficient exhaust for the mills to dissipate the heat generated in grinding.

As a comparison on power factor requirements it must be borne in mind that various different millers have different arrangements of mills. For example, it has recently been proposed to place the roller mills on the top floor with the plansifters below them and purifiers on the floor that is normally used for roller mills. The main advantage claimed for this re-arrangement of the layout of machines is a reduction in the height of the building by the elimination of a spout floor.

It is true that by re-arranging a mill in this way, the ground floor of the mill acts to some extent as a normal spout floor and allows all the products from the purifiers to be collected together for feeding any particular roller mill. It can therefore be reasonably claimed that in the case of those mills that would normally have provided a spout floor there can be a saving of one floor in height with this re-arrangement. It also follows that if the height of the building is reduced, there will be a saving in the power consumed by the pneumatic conveying system though an extra few feet in height does not affect the power very much and has very little effect on the already low power consumption of the low pressure pneumatic system.

We have found that such rearrangement of layout is inefficient for the following reasons:

1. One of the most important advantages of low pressure pneumatic conveying of stocks is that the heat created by the rollermills in grinding is removed by the air used in elevating the products from the rollermills. As a result, products are cool, sifting is improved, sweating is avoided, infestation is reduced, and a separate exhaust system for rollermills and sifters is eliminated. By placing the rollermills at the top of the mill, these advantages disappear. Even if water cooling of rolls is provided, a separate exhaust system is necessary on rollermills and sifting machines to prevent dust and danger of condensation.

2. The plansifter floor must not only contain the main drives for the plansifters but also the shafting, pulleys and belts for driving the rollermills as well as the trunking for the general exhaust of the rollermills and plansifters. This entails a very congested floor.

3. As pneumatic conveying is not used between rolls and plansifters, detachers are necessary to break up any flakes produced in the grinding operation. Space and accessibility are already limited on the plansifter floor.

4. In the orthodox pneumatic mill, the need for feed dividers above the plansifters is greatly reduced by the fact that each rollermill has its own individual pneumatic pipe. If, however, stock falls direct from rollermills to sifting machines, some form of feed divider is essential in a large mill. Once again, therefore, the plansifter floor becomes overcongested.

5. The roller floor must be very high to contain pneumatic cyclones, fans and filters. The plansifter floor must be exceptionally high to contain the additional items mentioned in points 2, 3 and 4. These factors tend to increase rather than reduce building costs, while making certain sections of the plant less accessible.

6. The weight of stock to be elevated by the pneumatic system is exactly the same for either lay out; in the one case, a certain weight of stock is elevated to feed the rollermills while in the other case, the same weight of stock is elevated from the rollermills to the sifting machines.

7. Building costs can be reduced to the minimum with the orthodox lay out. The machines can be carefully planned so that stocks from the purifiers fall by gravity to the rollermills, and where this is not possible, stocks can be re-elevated and spouted back to the rollermills. In such cases, it may be necessary to re-elevate as many as five different feeds to rollermills, but this takes little extra power with the low pressure pneumatic elevating system.

We have equipped several mills having a normal roller floor with vertical tubes and completely free from any conveyors, a purifier floor, and a plansifter floor at the top of the mill, making a total of three machine floors in addition to the ground floor. It will be seen that the spout floor has been eliminated and all the principal advantages of the pneumatic system retained, while needing a building with only three floors in addition to the ground floor. There are, of course, some cases where it may be more economical to introduce spout floors, but it is still possible to place the mill on top of the warehouse without making an exceptionally high building.

It will be seen, therefore, that the mill can be designed to reduce building costs to a minimum while retaining the rollermills in the orthodox position. If rollermills are placed on the top floor, the following disadvantages arise:

(a) There is no cooling of the warm stocks from the rollermills by the air used in elevating the stocks, which is the main advantage of pneumatic conveying.

(b) Power consumption is higher.

(c) Floors are more congested and therefore need to be higher.

(d) The plant is more complicated.

(e) The general exhaust must be retained.

Let us then compare the power consumption of such a mill with an orthodox bucket elevator mill and with pneumatic mills having the rollermills on the normal roller floor. We have taken for such a comparison an average mill with a capacity of twenty-five sacks of 280 lbs. of flour per hour (100 tons of wheat per twenty-four hours).

| | Bucket Elevator Mill | High Pressure System with Rollermills at bottom | High Pressure System with Rollermills at top | Low Pressure System with Rollermills at bottom |
|---|---|---|---|---|
| | H. P. | H. P. | H. P. | H. P. |
| Pneumatic conveying fans | | 90 | 90 | 30 |
| Low pressure fans | | 12 | 12 | 12 |
| Bucket elevators | 10 | | | |
| General exhaust on rollermills and plansifters | 20 | | 20 | |
| Remainder of mill, including rollermills, plansifters, purifiers, purifier exhaust, shafting | 155 | 155 | 155 | 155 |
| Total mill power consumed | 185 | 257 | 277 | 197 |

It should be noted that these are general average figures and will vary in minor details for each individual mill. The figure of 155 H. P. will vary considerably, particularly according to the variety of wheat being ground, whether hard or soft.

In accordance with our invention, we have equipped a mill throughout with pneumatic conveying of all stocks from the first break to the last reduction, this mill being operated on our low pressure system incorporating the features set forth herein. This mill includes rollermills, purifiers, plansifters and suction filter dust collectors. The mill is an entirely plansifter one, and has a capacity of 8½ sacks of flour (280 lbs.) per hour (34 tons of wheat per day).

The low pressure pneumatic installation handles all the mill stocks, employing twenty-five elevator pipes of various sizes—sixteen elevate stock from the rollermills and nine convey stock to the repurifiers and to plansifters for grading. There are nine gravity-assisted air spouts collecting the stock from the back line of rollermills. The cyclones are arranged in line just above the plansifters and are connected into one system. All the air is handled by one fan, which discharges into a suction filter dust collector. A low pressure fan exhausts the dust collector and returns the air to the mill or discharges it to atmosphere. The seals discharging the stock from the cyclones are coupled together in groups and are driven from the plansifter line-shaft. No separate exhaust other than that provided by the pneumatic installation is used for exhausting the rollermills or the sifting machines.

This new low pressure system makes pneumatic conveying a practical proposition for all mills, large or small. In small mills bucket elevators are naturally very inefficient, since a large number of elevators is required to convey the small quantities of material for the many different purposes that are necessary even in the smallest mill. In a large plant, the number of elevators required does not increase proportionately with the increase in capacity. For this reason, it was often reasonably economical, from the power point of view, to install a high pressure pneumatic system in a small mill. With our low pressure system the power consumed will be less than in a small capacity mill with bucket elevators.

For a large mill the installation is the same as in the plant described above except for the duplication of similar pipes, cyclones, etc., made necessary by the extra rollermills. Power consumption will therefore increase proportionately with the capacity of the mill, subject to variation in the height of the building, the number of additional elevating pipes caused by a more elaborate diagram (such as additional elevation for repurifiers) and whether it is possible to spout the stocks direct by gravity to the pneumatic elevating pipes, or whether it is necessary to introduce assisted gravity air spouts, which increases the overall power consumption of the pneumatic fan by about ten per cent. Nevertheless, pneumatic conveying is still an economical proposition even for a large mill when the low pressure system is used.

As an example of the practical application of our invention, an elevating plant comprising an elevating pipe of 3½" diameter and a vertical length of 60. ft. would, with a horsepower of 1.0 move 4,000 lbs. of wheat per hour. There is approximately 1.2 lbs. of stock between the rollermill and the cyclone separator at any one moment, but this figure varies considerably according to the terminal velocity of the stock. For a high pressure system performing a comparable service the power consumption would be two to three times as much.

What is claimed is:

1. A low pressure pneumatic conveying system for handling mill stocks for use in a flour mill comprising a downwardly extending gravitationally influenced conduit means for receiving stock and air to be conveyed, a substantially vertically extending elevator conduit, means for sucking air up said elevator conduit, means defining a cylindrical diffusing chamber between the elevator conduit and the conduit means and including a tangential inlet and a tangential outlet respectively communicating with the conduit means and said elevator conduits, a rotatable beater within the chamber effective to diffuse stock into the air flowing through the conduit means, the chamber and the elevator conduit and said beater having a plurality of narrow blades thereby minimizing resistance to air flow.

2. A low pressure pneumatic conveying system as defined in and by claim 1 and further including a cyclone separator having a tangentially arranged expansion chamber including a steeply sloped bottom having an upper end, an outer vortex chamber with which said expansion chamber communicates and a centrally disposed vertically extended outlet conduit, said expansion chamber having an inlet constituting an inlet to the cyclone and said vertical elevator conduit substantially directly communicating with the inlet of the expansion chamber directly adjacent the upper end of the steeply sloped bottom so as to provide a free flow of stock and air into said cyclone and to permit stock to fall by gravity either back down the elevator conduit or down the steeply sloped bottom in event of air failure whereby the flow of stock will not choke at the inlet of the cyclone, the means for sucking air comprising a pump communicating with the outlet of the cyclone and automatically operative release flaps embodied with the diffuser chamber and located respectively subjacent the inlet and outlet thereof, said flaps being movable between open and closed position and normally closed by suction through the diffuser chamber but automatically operative to open to permit excess stock to leave the system therethrough.

3. A low pressure method of pneumatically conveying mill stocks in a mill, comprising feeding stock to fall downwardly and tangentially into a substantially closed diffuser chamber, applying an air current from above and tangentially to said chamber to lift stock therefrom, agitating the stock in the chamber while offering minimum resistance to air flow through the chamber so as to diffuse the stock into the air to assist the directional change of movement of the stock, leading the stock and air into a separating zone, and separating the stock from the air within the zone while expanding the stock and air to reduce air pressure of the air leaving the zone.

4. A low pressure method of conveying mill stocks while simultaneously cooling the stock and mill grinding elements comprising drawing air into a mill above the grinding elements therein, establishing an air current through the mill that traverses the grinding elements and lowers the temperature of the stock leaving the elements, discharging the stock and air beneath the mill in a downward direction at an angle to the horizontal to permit gravity feed of stock and air under reduced pressure, changing the direction of flow of the stock and air into a substantially vertically extending flow, agitating the stock while offering minimum resistance to air flow to diffuse the stock into the air to assist the movement of stock during the change of direction and simultaneously permitting exhaust of stock in excess of that quantity that can be conveyed by the air to prevent choking of stock, directing the air and stock substantially directly into a separating zone while expanding the stream of stock and air to maintain a choke free flow into the separating zone, separating the air and stock within the zone to further reduce the air pressure and exhausting the separating zone with the exhausting of the separating zone providing the conveying air pressure and the current through the mill.

5. The method as defined in and by claim 4 and simultaneously breaking up mill flakes while diffusing the stock through the air.

6. A low pressure method of pneumatically conveying mill stocks comprising feeding the stock by gravity into a substantially vertical air stream, agitating the stock while offering minimum resistance to air flow to diffuse the stock into the stream and simultaneously exhausting stock in excess of that quantity that can be conveyed by the air, leading the stock and stream into a separating zone, imparting centrifugal force within the zone to separate the stock from the stream while suddenly expanding the stock and stream as it enters the zone to lower the power factor applying the centrifugal force and exhausting the separated stream from the zone.

7. A low pressure method of pneumatically conveying mill stocks comprises feeding stock by a gravity assisted air flow directed downwardly from beneath a mill, changing the direction of flow of the stream of air and stock to an upward, substantially vertical direction, agitating the stock while offering minimum resistance to air flow to diffuse the stock into the air stream simultaneously with the change in direction of flow to assist the stock in its change of direction upwardly, leading the stream and diffused stock substantially directly into a separating zone while simultaneously exhausting stock in excess of that quantity that can be conveyed by the air, applying centrifugal force within the zone to exhaust the same and separate the stock from the air stream and suddenly expanding the stream of stock and air as it enters the zone to provide a choke free flow of stock and air thereinto and to lower the exhausting power required to exhaust the zone and separate stock.

8. The method as defined in and by claim 7 and including admitting the conveying air into the mill in advance of the grinding elements therein so that the exhausting of the separating zone establishes an air current through the mill to dissipate the heat generated by the grinding elements and to cool the stock during conveying.

9. The method as defined in claim 7 and including exhausting air from other milling machines and introducing the exhausted air into the air flow from the mill before the change of direction of the stream to assist the air from the mill in elevating the stock up the elevating pipe.

10. Milling apparatus constituting a low pressure pneumatic conveying system and including a downwardly extending discharge spout communicating with a mill and through which stock feeds by gravity, means defining a diffusing chamber having an inlet communicating with the spout and a substantially vertically disposed outlet, said chamber having substantially greater cross sectional area than the spout, means for agitating the stock in the chamber while offering minimum resistance to flow through the chamber to diffuse the stock and assist its change of direction, a substantially vertically extending elevating pipe communicating with the outlet of the diffusing chamber, a cyclone separator having an outlet and a tangentially extending expansion chamber therein including an inlet and a steeply sloped bottom portion extending downwardly therefrom, said elevating pipe substantially directly communicating with the inlet of the expansion chamber to provide a choke free flow and air pressure inducing means communicating with the outlet of the cyclone to provide an air flow through the system.

11. Apparatus as defined in and by claim 10 in which the diffusing chamber is cylindrical and the inlet and outlet thereof are tangentially arranged and the means for agitating the stock includes rotatable beater means embodied within the chamber including a plurality of narrow blades for diffusing stock into the air stream.

12. Apparatus as defined in and by claim 11 in which at least one normally open movable release plate is embodied with the diffuser chamber which when in closed position due to suction constitutes a portion of said chamber and which opens upon pressure reduction to provide for automatic release of excess stock.

13. In a pneumatic elevating system in combination with a downwardly extending stock discharge spout and through which stock and air flows, a substantially vertically disposed elevating conduit, and means defining a diffuser chamber having tangentially arranged inlet and outlet portions respectively communicating with the spout and conduit, a rotatable beater within said chamber mounted for rotation about a horizontal axis and comprising a plurality of spirally arranged, elongated, narrow fingers for diffusing the stock into an air stream flowing through the chamber to assist the stock to change its direction of movement from the downward flow to the vertical flow through said elevating conduit.

14. In a pneumatic elevating system of a type including a cyclone separator on an upper mill floor, a mill on a lower floor, a substantially vertically disposed elevating conduit directly communicating with the cyclone and extending between the floors and terminating beneath the mill in lateral spaced relation relative thereto, a downwardly inclined spout communicating with the mill and terminating adjacent and beneath said elevating conduit, means defining a diffuser chamber positioned between the terminal ends of said spout and conduit respectively, said chamber having cylindrical form and including tangential inlet and outlet means respectively communicating with the spout and conduit, stock agitating means embodied within the chamber to diffuse stock into an air current flowing therethrough, an exhaust means communicating with the cyclone to provide a conveying air current through the cyclone, conduits, chamber and spout, and said chamber having at least one pivotally mounted release flap embodied therewith, said flap closing on the application of suction through the conduit but automatically opening in the event of excess flow of stock to release excess stock from the chamber.

15. In a pneumatic elevating system including means providing a discharge spout extending downwardly and at an angle to the horizontal, a substantially vertical elevator pipe, a cyclone separator substantially directly communicating with the upper end of said pipe, an air current producing means communicating with the cyclone to draw air therethrough, and a diffuser chamber between the spout and the conduit and through which stock passes during conveying, stock diffusing means within the chamber including a rotatable beater having a plurality of spirally arranged elongated narrow fingers, the arrangement and disposition of said fingers offering minimum resistance to air flow, and said cyclone having an expansion chamber including a steeply sloped bottom and an inlet providing the substantially direct communication between the pipe and cyclone.

16. In a pneumatic elevating system in which stock flows downwardly from a mill and then vertically upward to a separating zone, a diffusing chamber through which the stock passes and changes its direction of flow from the downward to the upward direction and comprising spaced side plates, top and bottom plates, means for assembling the plates to partially define a chamber, said side plates having greater longitudinal extent than the top plate so as to provide an open area outwardly of the opposite edges of the top plate, pivotal flap means mounted between the side plates outwardly at the opposite ends of the top plate cooperational with the bottom plate in closed position to constitute opposite end walls of the chamber, said top and bottom plate having arcuate portions constituting arcs of the same circle and said flap means respectively extending tangentially of said circle, said flaps being normally open and moving to closed position responsive to air flow through the chamber, an inlet duct communicating with said chamber tangentially of said circle, an outlet duct extending tangentially from said chamber constituting means confining air and stock flowing through the chamber to an upward elevating flow, a horizontal shaft extending through the axis of said chamber and between the side plates and having a plurality of spirally arranged elongated narrow fingers projecting radially thereof for diffusing stock through the air stream flowing through the chamber to assist the change of direction of movement of the stock.

17. In a pneumatic system as defined in and by claim 16 and spaced tubular bearing housings carried by the respective side plates and surrounding opposite portions of said shaft, bearing assemblies supported within the housings and journalling said shaft, and drivable means embodied with said shaft for rotating the same.

18. In a pneumatic conveying system and in combination, a downwardly extending discharge spout through which stock and air passes, a vertically extending elevating conduit, air pressure inducing means communicating therewith, said conduit terminating in lateral spaced relation with respect to the terminal end of the spout means defining a diffuser chamber having a substantially cylindrical section about a horizontal axis including inlet and outlet means disposed tangentially with respect thereto and respectively communicating with the spout and conduit, said chamber having substantially greater cross sectional area than said spout and conduit, means for agitating the stock in the chamber while offering minimum resistance to air flow through the chamber to assist the change of direction of the stock and pivotally mounted release flaps constituting portions of said chamber in closed position, said flaps being mounted for pivotation about horizontal axes parallel with the axis of the chamber and respectively disposed subjacent the inlet and outlet means, the flaps being closed upon application of suction to said chamber and automatically opening upon decrease of suction or upon excess flow of stock through the chamber so as to automatically release the excess.

19. In a pneumatic elevating system of the type for use in a flour mill, a downwardly extending gravitationally influenced spout through which stock and air flow, a substantially vertically extending elevating conduit and a diffuser chamber communicating respectively with the spout and conduit and embodying means to diffuse stock into an air stream flowing therethrough, said chamber having substantially greater cross sectional area than the spout, a cyclone separator having a top, means defining an outer vortex chamber, a vertically extending outlet conduit therewithin, a cylindrical outlet chamber connected to the top including a tangentially directed outlet conduit, an expansion chamber embodied with the cyclone disposed tangentially with respect to the axis thereof and including a steeply sloped bottom portion having an angle of not less than 60° to the horizontal and extending downwardly to and terminating above the lower terminal edge of the outlet conduit at a point in parallelism with the axis of the cyclone, the said bottom further terminating in spaced relation to the top of the cyclone, and the expansion chamber further including an integral inlet conduit in direct communication with the elevating conduit and extending at an angle of 30° to the vertical plane passing through the upper terminal end of the bottom and the top, said inlet conduit including top and bottom walls merging respectively with the said bottom and the top of the cyclone, the top wall having a curvature about a 135° inside radius and the bottom wall having two curved portions including a portion directly adjacent the bottom curved on a 65° radius and a portion extending from that portion to and merging into a plane parallel with the axis of the inlet duct on a 190° radius, and said inlet duct directly communicating with said elevating conduit.

20. In a pneumatic elevating system as defined in and by claim 19, and said outlet chamber including spaced top and bottom apertured plates, a concentric circular series of attaching means embodied in vertically aligned relation on the facing surfaces of the plates, and a removable cover plate for closing the aperture in the top plate when the bottom plate is attached to the cyclone, whereby the direction of extent and position of the tangential outlet duct of the outlet chamber can be varied by selectively attaching either the top or bottom plate to the top of a cyclone so that the outlet chamber is cooperable with either right or left hand cyclones.

21. A low pressure pneumatic conveying system comprising in combination a downwardly extending conduit through which air and stock to be conveyed can flow, a vertically extending elevating pipe, means defining a diffusing chamber including an inlet and an outlet respectively connected to said conduit and said elevating pipe, said chamber having substantially greater cross sectional area than said conduit, means operable to apply agitating action to stock flowing down said conduit and into said chamber so as to diffuse stock into the air stream flowing therethrough while offering minimum resistance to air flow, air pressure inducing means connected to said elevating pipe and stock exhaust means embodied with the chamber and automatically operable to exhaust stock in excess of that quantity that can be carried by the air.

22. The combination as defined in and by claim 21 and a cyclone separator including a tangentially arranged expansion chamber having an inlet substantially directly communicating with said elevating conduit, and a steeply sloped bottom, an outlet for the cyclone and said air pressure inducing means communicating with said outlet.

23. A low pressure pneumatic conveying system comprising in combination a conduit extending at an angle to the horizontal and constituting a gravitationally influenced inlet through which stock and air to be conveyed can pass, a vertically extending elevating conduit, means defining a diffusing chamber including an inlet and an outlet respectively connected to the first and second mentioned conduits, said chamber having substantially greater cross sectional area than said conduits, means embodied with the chamber means for adjusting to the necessary minimum the quantity of air used to elevate the stock through the elevating conduit including means within the chamber for agitating the stock within the chamber to diffuse the stock into an air stream flowing therethrough while offering minimum resistance to air flow and to assist the stock in its change of direction, and air pressure inducing means communicating with said elevating pipe.

24. In a low pressure pneumatic conveying system for handling flour mill stocks, the combination of a first conduit extending at an angle to the horizontal and constituting a gravitationally influenced spout through which air and stock to be conveyed passes, said conduit terminating in a lower end, a second conduit extending substantially vertical and including a lower terminal end disposed in lateral spaced relation with respect to the lower terminal end of the first conduit and in a horizontal plane at least adjacent the horizontal plane containing the lower end of the first conduit, a diffusing chamber located between the conduits and including tangentially disposed inlet and outlet sections respectively communicating with the first and second mentioned conduits, rotatable means within the diffuser chamber, and normally open flap means embodied with the diffuser chamber and cooperable with the rotatable means to permit automatic ejection of stock in excess of that which the conduits may carry, said rotatable means contributing to the breaking up of flakes in the stock being conveyed, and the rotatable means assisting conveyance of stock in its change in direction from its downward flow from the inclined first conduit to the upward flow in the second conduit while thoroughly diffusing the stock in the air, and air current inducing means communicating with the second conduit at a point in substantial axial spaced relationship from the terminal end thereof.

25. The combination as claimed in claim 24 and in which the rotatable means constitutes a beater having a plurality of blades thereon, each blade being narrow with respect to the transverse dimensions of the chamber and said chamber including upper and lower arcuate portions so that it is substantially cylindrical in cross section about a horizontal axis, a shaft supporting said blades and said blades being spirally arranged on said shaft.

References Cited in the file of this patent

UNITED STATES PATENTS

| Number | Name | Date |
|---|---|---|
| 297,757 | Case | Apr. 29, 1884 |
| 671,161 | Day | Apr. 2, 1901 |
| 696,870 | Kessler | Apr. 1, 1902 |
| 788,741 | Trump | May 2, 1905 |
| 1,609,401 | Crites | Dec. 7, 1926 |
| 1,793,098 | Kramer | Feb. 17, 1931 |
| 1,897,144 | Prouty | Feb. 14, 1933 |
| 2,087,464 | Ayers | July 20, 1937 |

FOREIGN PATENTS

| Number | Country | Date |
|---|---|---|
| 231,487 | Switzerland | June 16, 1944 |

OTHER REFERENCES

American Miller and Processor, June 1946, pp. 38–42, 46, 82, 85. Pneumatics for Grain Processing Plants, by H. K. Ferguson.